(12) United States Patent
Yu

(10) Patent No.: US 9,074,724 B2
(45) Date of Patent: Jul. 7, 2015

(54) DOCKING STATION FOR ELECTRONIC DEVICE

(71) Applicant: Wei-Wei Yu, Shenzhen (CN)

(72) Inventor: Wei-Wei Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 338 days.

(21) Appl. No.: 13/657,905

(22) Filed: Oct. 23, 2012

(65) Prior Publication Data

US 2013/0166808 A1    Jun. 27, 2013

(30) Foreign Application Priority Data

Dec. 24, 2011    (CN) .......................... 2011 1 0438356

(51) Int. Cl.
| | |
|---|---|
| H05K 5/00 | (2006.01) |
| H05K 7/00 | (2006.01) |
| G06F 1/16 | (2006.01) |
| F16M 11/04 | (2006.01) |
| F16M 11/10 | (2006.01) |
| F16M 11/38 | (2006.01) |
| F16M 13/00 | (2006.01) |
| G06F 1/00 | (2006.01) |

(52) U.S. Cl.
CPC .............. *F16M 11/041* (2013.01); *F16M 11/10* (2013.01); *F16M 11/38* (2013.01); *F16M 13/00* (2013.01); *G06F 1/00* (2013.01); *G06F 1/1632* (2013.01)

(58) Field of Classification Search
CPC ............................. G06F 1/1626; G06F 1/1632
USPC .............. 361/679.41, 679.44, 679.55, 679.56
See application file for complete search history.

(56) References Cited

U.S. PATENT DOCUMENTS

| | | | | |
|---|---|---|---|---|
| 6,108,200 | A * | 8/2000 | Fullerton ................. | 361/679.12 |
| 6,496,365 | B2 * | 12/2002 | Tsai ............................ | 361/679.4 |
| 6,538,642 | B2 * | 3/2003 | Tsai .............................. | 345/168 |
| 6,690,353 | B2 * | 2/2004 | Chang .......................... | 345/156 |
| 6,986,492 | B2 * | 1/2006 | Huang et al. ............. | 248/346.03 |
| 6,999,008 | B2 * | 2/2006 | Wang et al. ..................... | 341/22 |
| 7,017,243 | B2 * | 3/2006 | Carnevali ........................ | 24/523 |
| 7,327,560 | B1 * | 2/2008 | Tabasso et al. .......... | 361/679.09 |
| 8,472,168 | B2 * | 6/2013 | Su ............................ | 361/679.01 |
| 2002/0159226 | A1 * | 10/2002 | Huang et al. .................. | 361/680 |
| 2003/0025674 | A1 * | 2/2003 | Watanabe ..................... | 345/168 |
| 2004/0212954 | A1 * | 10/2004 | Ulla et al. ..................... | 361/680 |

* cited by examiner

*Primary Examiner* — Anthony Haughton
(74) *Attorney, Agent, or Firm* — Novak Druce Connolly Bove + Quigg LLP

(57) ABSTRACT

A docking station for an electronic device, includes a base for supporting a bottom of the electronic device, a supporting portion secured to the base for abutting a rear portion of the electronic device; and two clipping portions rotatably coupled to opposite ends of the supporting portion. The clipping portions respectively clip opposite sides of the electronic device and cooperate with the base and the supporting portion to hold the electronic device in the docking station.

10 Claims, 5 Drawing Sheets

DOCKING STATION FOR ELECTRONIC DEVICE

BACKGROUND

1. Technical Field

The present disclosure relates to a docking station for an electronic device.

2. Description of Related Art

Hand-held electronic devices, such as mobile phones, often use docking stations for support. The docking station usually includes a main body and one or more interfaces (such as a USB port) projecting out of the main body. The interface can be inserted into the electronic device, whereby the electronic device is electrically connected to the docking station. However, the docking station may support the electronic device in a particular orientation, and the docking station cannot be used to support the electronic device in another position.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
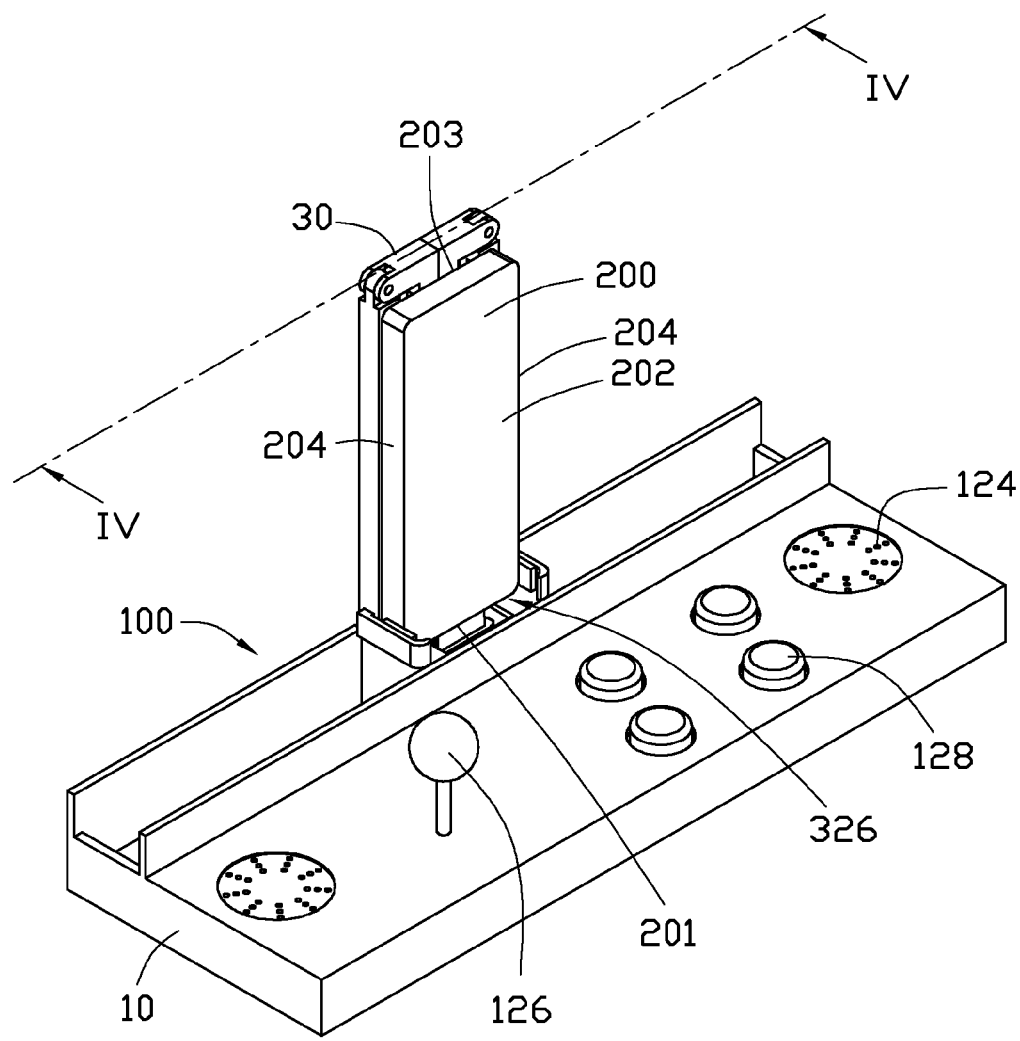
FIG. 1 is a perspective view showing a docking station supporting an electronic device in accordance with an embodiment.

Referring to FIG. 1, an embodiment of a docking station 100 is shown. The docking station 100 is used for supporting an electronic device 200. The electronic device 200 may be a cellular phone, a personal digital assistant (PDA), or a media player, for example. The docking station 100 is capable of supporting the electronic device 200 in different angles.

Figure 2:
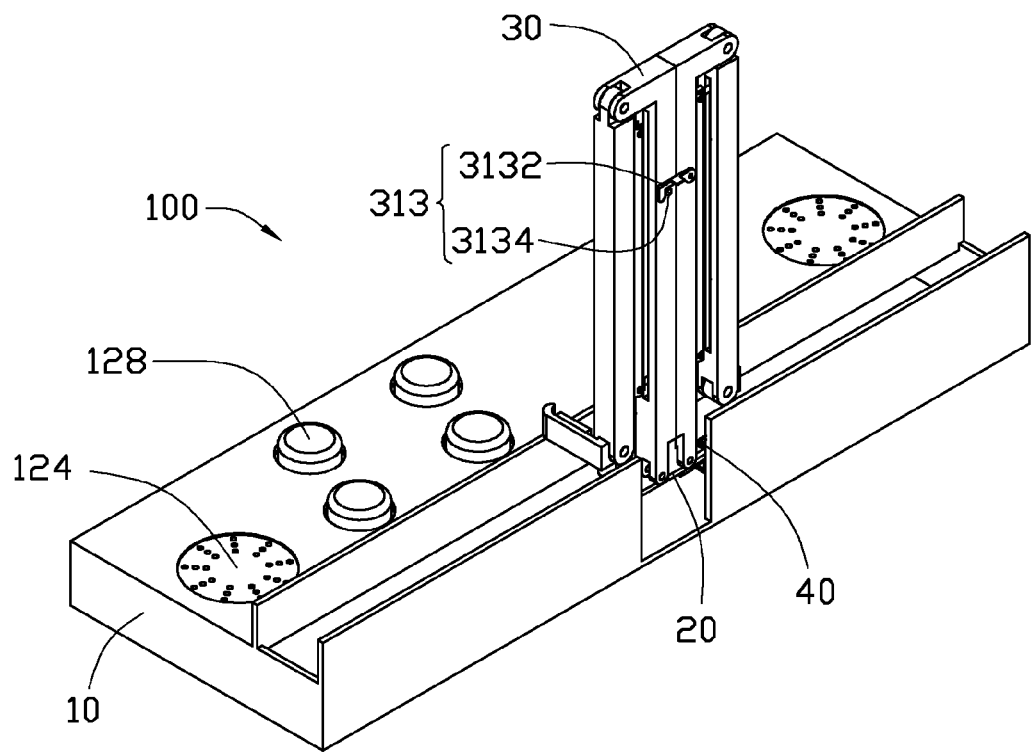
FIG. 2 is a perspective view of the docking station of FIG. 1.
Figure 3:
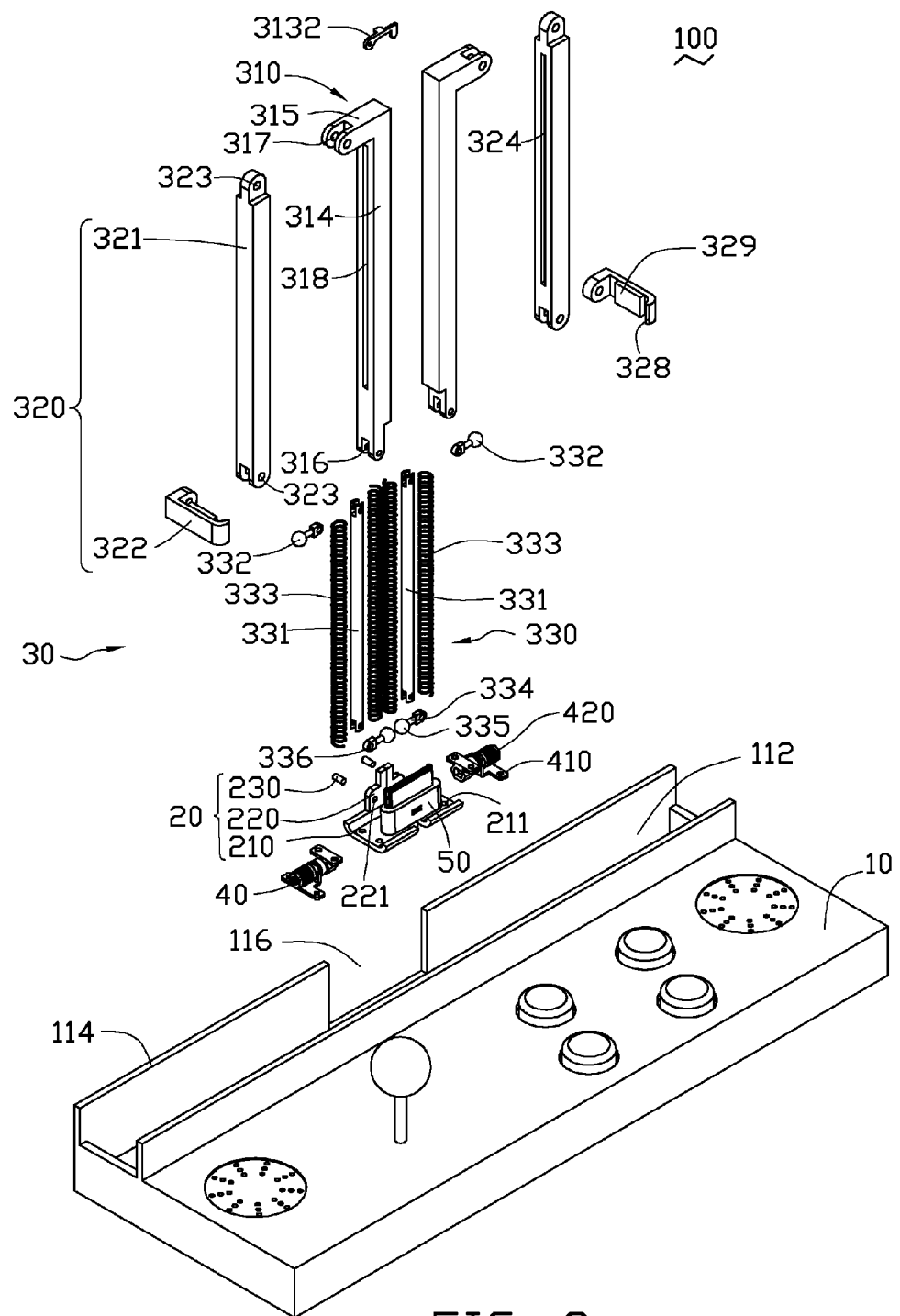
FIG. 3 is a disassembly view of the docking station of FIG. 2.

Referring also to FIGS. 2-3, the docking station 100 includes a main body 10, a base 20 secured to the main body 10, a clipping mechanism 30, two hinges 40 for pivotally connecting the clipping mechanism 30 to the base 20, and a plug 50 secured to the base 20 for electrically connecting the electronic device 200 to the docking station 100.

The main body 10 is substantially a hollow rectangle. The main body 10 in the embodiment is a control console for controlling games executed in the electronic device 200. Two speakers 124 are mounted on the main body 10 for outputting sound from the electronic device 200. A joystick 126 and a plurality of buttons 128 are secured to the main body 10 for receiving user's operations. The main body 10 defines a receiving groove 112 for receiving the clipping mechanism 30. The receiving groove 112 is arranged adjacent to an end of the main body 10 and extends a length of the main body 10. Two protruding plates 114 extend from opposite edges of the receiving groove 112. The middle of the protruding plate 114 away from the buttons 128 defines an opening 116 (see FIG. 3).

The hinges 40 are fixed to the bottom of the receiving groove 112 and correspond to the opening 116. Each hinge 40 includes a fixing portion 410 fixed to the bottom of the receiving groove 112, and a rotating portion 420 rotatably coupled to the fixing portion 410.

The base 20 is adapted to support a bottom end of the electronic device 200. The base 20 is fixed to the rotating portions 420 and corresponds to the opening 116, thereby the base 20 is rotatable relative to the main body 10. The base 20 includes a fixing plate 210, a bearing 220 fixed to the fixing plate 210, and two shafts 230. The fixing plate 210 is substantially rectangular. Opposite ends of the fixing plate 210 define two pairs of fixing holes 211 for fixing the fixing plate 210 to the rotating portions 420. The bearing 220 defines two pivoting holes 221 for receiving the shafts 230.

The plug 50 is mounted on the fixing plate 210 and is substantially parallel to the bearing 220. The plug 50 mates with a socket (not shown) of the electronic device 200. The plug 50 can be inserted into the socket of the electronic device 200 to electrically connect the electronic device 200 to the docking station 100 when the electronic device 200 is supported by the docking station 100.

The clipping mechanism 30 is adapted to clip the electronic device 200 and cooperatives with the base 20 to hold the electronic device 200 in the docking station 100. The clipping mechanism 30 includes a supporting portion 310, two clipping portions 320, and two elastic assemblies 330.

The supporting portion 310 is secured to the bearing 220 and is adapted to abut a rear portion of the electronic device 200. The supporting portion 310 includes two supporting arms 312 (see FIG. 4) and a latching assembly 313. The supporting arms 312 are rotatably secured to the bearing 220 via the shafts 230. The supporting arms 312 are capable of rotating from a first position resisting against each other to a second position being spaced apart from each other. Each support arm 312 is substantially L-shaped, and includes a supporting post 314 and a pivoting post 315 perpendicularly bending from an end of the pivoting post 315 away from the bearing 220. An end of the supporting post 314 away from the pivoting post 315 defines a first shaft hole 316 for receiving one of the shafts 230. The supporting post 314 further defines a first sliding slot 318 extending lengthwise of the supporting post 314. The shape of the first sliding slot 318 in cross section is substantially T-shaped. The first sliding slot 318 includes a first wider portion 3182 (see FIG. 4) and a first narrower portion 3184 (see FIG. 4) communicating with the first wider portion 3182. The width of the first wider portion 3182 in cross section perpendicular to the supporting post 314 is greater than that of the first narrower portion 3184. The first narrower portion 3184 is exposed and a part of the first wider portion 3182 is capable of being viewed through the first narrower portion 3184. In the embodiment, the supporting post 314 is capable of being disassembled into two symmetrical parts (not labeled) with the first sliding slot 318 being evenly divided into two parts.

The latching assembly 313 includes a hook member 3132 and a latching post 3134. The hook member 3132 and the latching post 3134 are respectively secured to the supporting posts 314. The hook member 3132 is capable of being latched to the latching post 3134 to prevent the supporting posts 314 from being apart from each other, and is capable of disengaging with the latching post 3134 to allow the supporting posts 314 to be apart from each other.

The clipping portions 320 are adapted to clip opposite sides of the electronic device 200, thus, the clipping portions 320 cooperate with the base 20 and the supporting portion 310 to hold the electronic device 200 in the docking station 100. Each clipping portion 320 includes a connecting post 321 and a clipping block 322.

Each connecting post 321 is rotatably coupled to each pivoting post 315. Opposite ends of the connecting post 321 respectively define two through holes 323. The connecting post 321 further defines a second sliding slot 324. The second sliding slot 324 extends in the lengthwise direction of the connecting post 321. The second sliding slot 324 is similar to the first sliding slot 318, and includes a second wider portion 3242 (see FIG. 4) and a second narrower portion 3244 (see FIG. 4) communicating with the second wider portion 3242. The width of the second wider portion 3242 in cross section perpendicular to the connecting post 321 is greater than that of the second narrower portion 3244. The second narrower portion 3244 is exposed and a part of the second wider portion 3242 is capable of being viewed through the second narrower portion 3244. In the embodiment, the connecting post 321 is capable of being disassembled into two symmetrical parts (not labeled) with the second sliding slot 324 being evenly divided into two parts.

Each clipping portion 322 is secured to an end of each connecting post 321 away from the pivoting post 315 and protrudes out of a plane where the supporting posts 314 aligns. The clipping portions 322 face each other and cooperate with the base 20 and the supporting portion 310 to define a clipping space 326 (see FIG. 1) for receiving the electronic device 200. An end of each clipping portion 322 away from the connecting post 321 bends to form a hook 328. The hooks 328 hook the front surface of the electronic device 200 when the electronic device 200 is received in the clipping space 326. Two cushions 329 are respectively secured to the clipping portions 322. The cushions 329 respectively abut opposite sides of the electronic device 200 to prevent the electronic device 200 from being scraped.

The elastic assemblies 330 are adapted to provide an elastic force for driving the clipping portions 322 to move toward each other to steadily clip the electronic device 200 therebetween. Each elastic assembly 330 includes a connecting rod 331, two sliding members 332, and two elastic members 333. The sliding members 332 are rotatably secured to opposite ends of the connecting rod 331. Each sliding member 332 includes a sliding post 334, a limiting portion 335, and a pivoting portion 336. Each sliding post 334 is slidably received in each first and second narrower portions 3184, 3244. The limiting portion 335 and the pivoting portion 336 are secured to opposite ends of the sliding post 334. The limiting portion 335 is substantially spherical in the embodiment. The size of the limiting portion 335 is less than the width of each first and second wider portions 3182, 3242, but is greater than the width of each first and second narrower portions 3184, 3244. The pivoting portions 336 are rotatably secured to ends of the connecting rod 331 respectively. The elastic members 333 are respectively received in the first and second wider portions 3182, 3242. The length of the elastic member 333 is equal to or greater than the length of each the first and second wider portions 3182, 3242.

Figure 4:
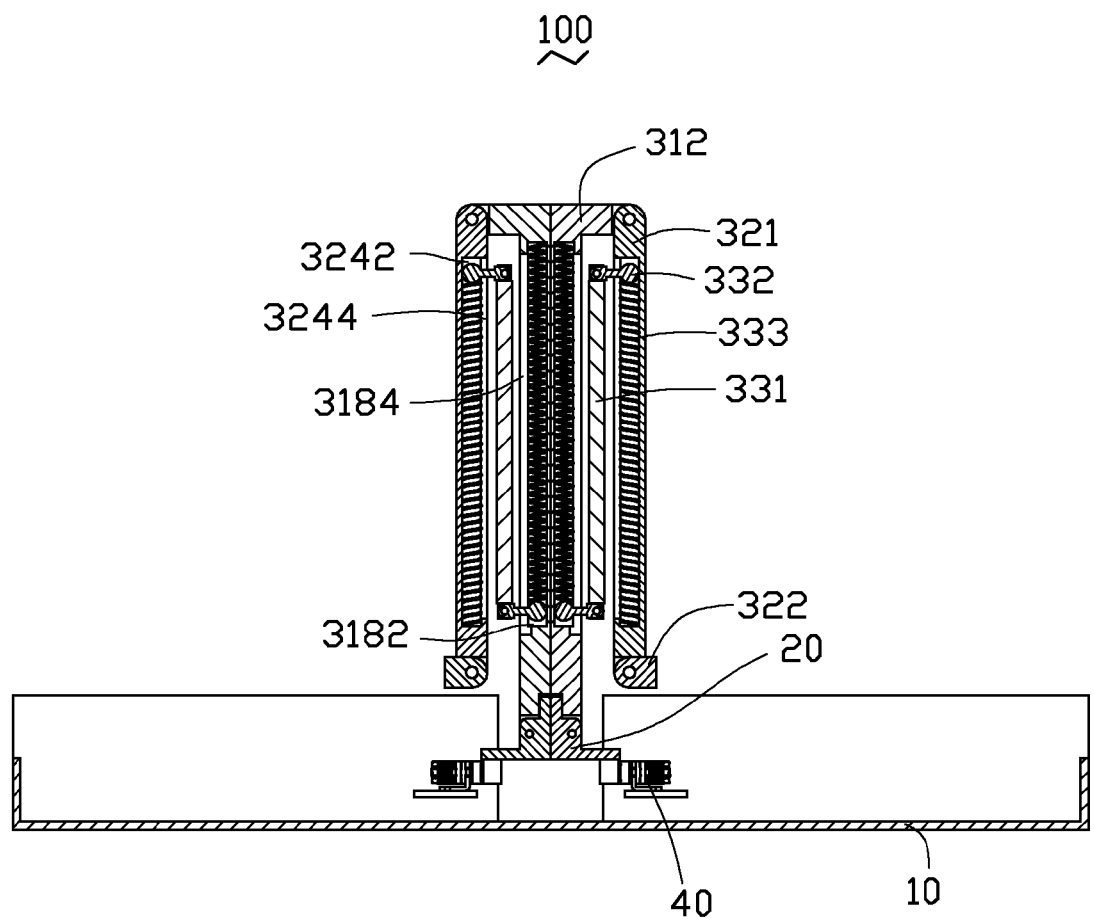
FIG. 4 is a cross-sectional view taken alone line IV-IV of FIG. 1.

Referring to FIG. 4, in assembly, first, the fixing portions 410 are fixed to main body 10, and the fixing plate 210 is secured to the rotating portion 420 and corresponds to the opening 116. Second, the supporting arms 312 are secured to the bearing 220 via the shafts 230, and the clipping portions 320 are respectively secured to the pivoting posts 314 with the clipping blocks 322 facing each other. Third, the elastic members 333 are deformed to be respectively received in the first and second wider portions 3182, 3242, each two pivoting portions 336 are respectively secured to ends of the connecting rod 331, with one of the limiting portions 335 being received between an end of the first wider portion 3182 away from the pivoting post 315 and one of the elastic member 333, and the other one of the limiting portion 335 being received between an end of the second wider portion 3242 adjacent to the pivoting post 315 and the other elastic member 333. Finally, the plug 50 is secured to the fixing plate 210.

Referring to FIGS. 1 and 4, in use, the supporting arms 312 are rotated to the first position and are latched together by the latching assembly 313. The clipping portions 320 are rotated to move in reverse direction to allow the electronic device 200 being received in the clipping space 326 and engaging with the plug 50, and the elastic members 333 are further deformed by the corresponding limiting potions 335. After the electronic device 200 is received between the clipping portions 320, the elastic assembly 330 restores to an original state to provide an elastic force for driving the clipping portions 320 to clip the electronic device 200, thus, the electronic device 200 is steadily held by the docking station 100. Furthermore, because the base 20 is rotatably secured to the hinges 40, angles of the electronic device 200 can be adjusted by rotating the base 20 to allow the electronic device 200 to be viewed at different angles.

Figure 5:
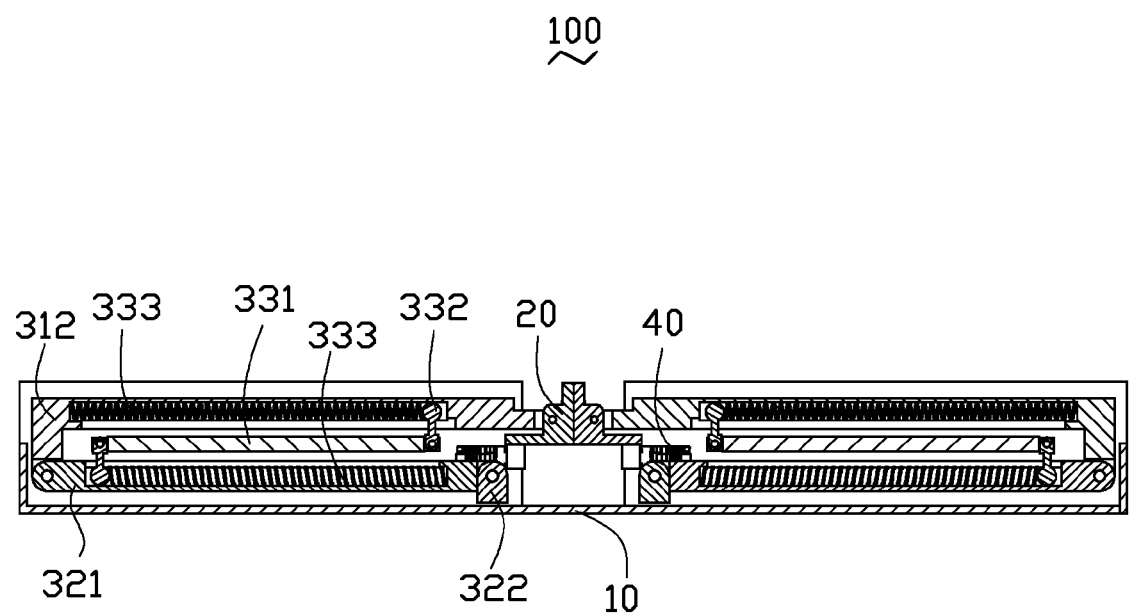
FIG. 5 is a cross-sectional view showing the docking station of FIG. 2 being not used.

Referring to FIG. 5, when the electronic device 200 is not used, the electronic device 200 is removed from the docking station 100, the latching assembly 313 is operated to allow the supporting arms 310 to be apart from each other. The supporting arms 310 are rotated to move in reverse directions and are further received in the receiving slot 112.

With assistance of the docking station 100, the electronic device 200 is capable of being supported in different angles, which is convenient.

Even though information and the advantages of the present embodiments have been set forth in the foregoing description, together with details of the structures and functions of the present embodiments, the disclosure is illustrative only; and changes may be made in detail, especially in matters of shape, size, and arrangement of parts within the principles of the present embodiments to the full extent indicated by the broad general meaning of the terms in which the appended claims are expressed.

What is claimed is:

1. A docking station for an electronic device, comprising:
a base for supporting a bottom of the electronic device;
a supporting portion secured to the base for abutting a rear portion of the electronic device; and
two clipping portions rotatably coupled to opposite ends of the supporting portion;
wherein the clipping portions respectively clip opposite sides of the electronic device and cooperate with the base and the supporting portion to hold the electronic device in the docking station;
wherein each clipping portion comprises a connecting post and a clipping block; the connecting post is rotatably coupled to the supporting portion, and the clipping block is secured to an end of the connecting post away from the supporting portion;
wherein the docking station further comprises two elastic assemblies, opposite ends of each elastic assembly are secured to the supporting portion and each clipping portion for providing an elastic force to drive the clipping portions to move toward each other; and wherein each elastic assembly comprises a connecting rod, two sliding members and two elastic members, the sliding members are secured to opposite ends of the connecting rod, the elastic members respectively abut the sliding member.

2. The docking station of claim 1, wherein the clipping blocks face each other and cooperate with the base and the supporting portion to define a clipping space for receiving the electronic device.

3. The docking station of claim 2, wherein ends of the clipping blocks away from the corresponding connecting post bent to form two hooks; the hooks extend toward each other and are adapted to abut a front portion of the electronic device when the electronic device is received in the clipping space.

4. The docking station of claim 1, wherein opposite ends of the supporting portion defines two first sliding slots, the connecting posts respectively defines two second sliding slots corresponding the first sliding slots; the elastic members are respectively received in the first and second sliding slots; one of the sliding members abuts an end of one of the elastic member adjacent to the joint of the clipping portion and the supporting portion, and the other sliding member abuts an end of the other elastic member away from the joint of the clipping portion and the supporting portion.

5. The docking station of claim 1, wherein the supporting portion comprises two supporting arms, the clipping portions are respectively coupled to the supporting arms.

6. The docking station of claim 5, wherein the supporting arms are rotatably secured to the base and are capable of rotating from a first position being abutting each other to a second position being apart from each other.

7. The docking station of claim 5, wherein the supporting portion further comprises a latching post and a hook member, the latching post and the hook member are respectively secured to the supporting arms, and are capable of engaging with each other to latch the supporting arms together, and are capable of disengaging with each other to allow the supporting arms to be apart from each other.

8. The docking station of claim 5, further comprising a main body and two hinges fixed to the main body, wherein the base is secured to the hinges and is capable of rotating relative to the main body to allow angles of the electronic device to be adjusted.

9. The docking station of claim 8, wherein the main body defines a receiving groove for receiving the supporting arms.

10. The docking station of claim 1, further comprising a plug, wherein the plug is secured to the base and is capable of being inserted into the electronic device to electrically connect the electronic device to the docking station.

* * * * *